May 8, 1928. 1,669,179
A. VAN DER LUFT
MECHANISM FOR ROLLING STORAGE BATTERY GRIDS
Filed April 19, 1924
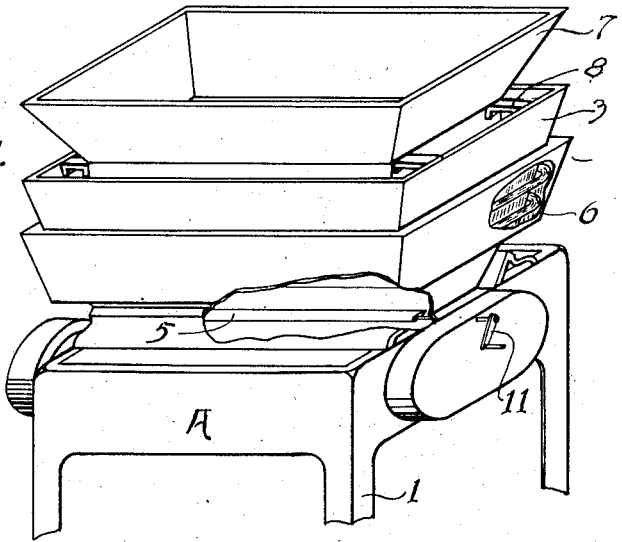
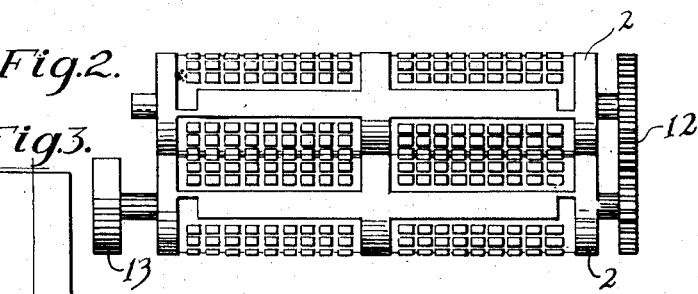
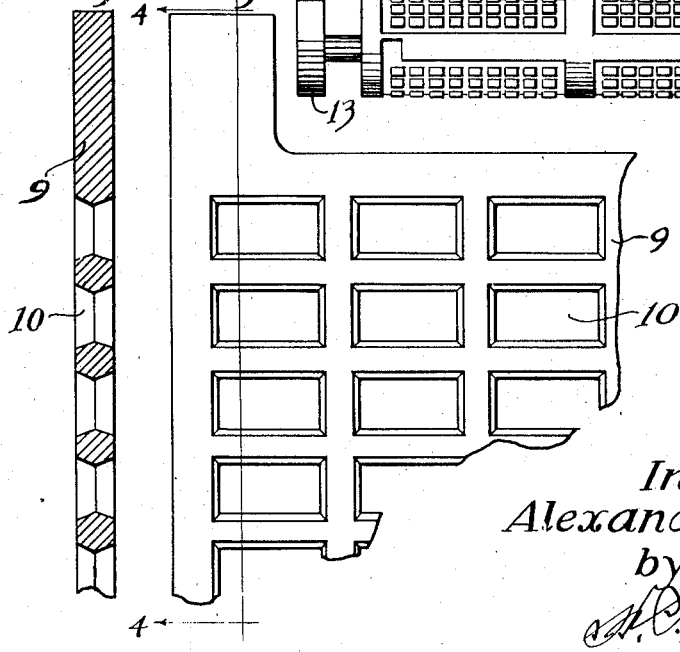
Inventor
Alexander Van der Luft
by
H. C. Johnson
Att'y Patented May 8, 1928.

1,669,179

UNITED STATES PATENT OFFICE.

ALEXANDER VAN DER LUFT, OF ST. PAUL, MINNESOTA.

MECHANISM FOR ROLLING STORAGE-BATTERY GRIDS.

Application filed April 19, 1924. Serial No. 707,611.

The present invention relates to rolling mechanism, and more particularly to a machine for rolling lead into the form of storage battery grids.

Most of the grid plates employed at present in the manufacture of storage batteries are made by casting lead into the form of grid plates, having openings therein. These openings are packed with lead sulphate and the battery is then assembled, filled with diluted sulphuric acid, and charged. In order to make lead flow freely into a mold while casting, it is necessary to add a small amount of antimony, or other low melting metal to the lead, although the addition of such metal is not desirable in a battery grid plate.

An object of the present invention is to form lead into a storage battery grid plate by rolling it.

Another object is to improve and simplify a method of manufacturing storage battery grid plates.

In order to attain these objects there is provided in accordance with one feature of the invention, a main hopper, having heating means adjacent thereto, in which lead is reduced to a molten state, an auxiliary hopper placed above the main hopper to feed a supply of lead into the main hopper, and rolls placed beneath an opening in the bottom of the main hopper, said rolls having a configuration on the surface thereof of a shape to form lead, expressed therebetween from the main hopper, into perforated plates suitable for use as storage battery grids.

These and other features of the invention not specifically mentioned will be more fully brought out in the following description and the accompanying drawings, wherein:

Figure 1, is a view in isometric projection of a machine made in accordance with the present invention, portions thereof being broken away.

Figure 2, is a view in top elevation of a pair of rollers made in accordance with the present invention, having impressed on the surfaces thereof opposed patterns of a shape to form battery grids from lead expressed therebetween.

Figure 3, is a fragmentary front elevation of a battery grid made by the machine, shown in Figure 1; and Figure 4, is a section thereof on the line 4—4 of Figure 3.

Referring to the drawings in detail, a supporting frame A is provided with legs 1, and cylindrical rolls 2, which are rotatably supported by the frame A in position laterally adjacent each other as shown in Figure 2. In the periphery of each of the rolls is a pattern as shown, of a configuration to form material expressed between the rolls into the form shown in Figures 3 and 4. Gears 12 are connected to the shafts of rolls 2 and serve to keep the patterns on the rolls in register with each other. A pulley 13 connected to the shaft of one of the rolls may be rotated by a belt, not shown, attached to a suitable source of power. Carried by the frame A above the rolls 2 is a hopper 3 which may be termed the main hopper, and this hopper is provided with a slotted opening centrally located in the bottom thereof immediately above the line of juncture of the two rolls. Means for sealing the slotted opening at will is provided by a gate 5, pivoted at the ends and operated by a handle 11. Surrounding the main hopper 3 is a heating element 6 which is here shown as a plurality of electrical heating coils, although a gas or similar flame directed against the sides of the hopper would serve the same purpose; namely, that of melting lead contained in the hopper and maintaining it at a temperature just above the point of fusion thereof. A second hopper 7 which may be termed a storage hopper may be supported with respect to the main hopper as by means of supports 8. This second hopper may be charged with a supply of lead which will be fed down into the main hopper by gravity, and thereby continuously supply the main hopper with lead which will be melted by the heating element up to the bottom of the secondary hopper. Inasmuch as the lead in the secondary hopper is held away from the heating element by the walls of the secondary hopper the lead therein will not be melted until fed down into the main hopper.

The operation of the device is as follows:

A supply of solid metallic lead is placed in the secondary hopper 7, and a portion of it passes down into the main hopper 3. Here it is subjected to the heat of element 6 and melted thereby. When a sufficient amount of molten lead is present in the main hopper, the gate 5 may be opened and molten lead allowed to flow down onto the rolls 2. The rolls may then be started to rotate inwardly toward each other so as to express lead between them, and the pattern impressed in the face of the rolls will be communicated to the lead as it is expressed between them and plates 9 similar to that shown in Figures 3 and 4 will be formed by and discharged from the machine. The cooling effect of the rolls and the atmosphere is sufficient to solidify the molten lead as it is expressed by the rolls.

The grid plates formed by a machine made in accordance with this invention have openings 10 which are packed with lead sulphate paste which, in accordance with a well known principle, is changed upon charging in the positive plates to lead dioxide and in the negative plates to sponge lead. By shaping the indentures in the rolls to produce perforations in the lead grid plates of the shape shown in the illustration, the paste of lead sulphate is gripped in each perforation and secured against dislodgment.

In using the present mechanism to form battery grid plates no lead is wasted as is the case in casting, where the lead in the gate portion of a mold must be broken off and scrapped.

What I claim is:

In a battery grid rolling machine having a container for melting metal, a discharge opening control means for discharging metal from said container, a pair of rolls positioned to receive melted metal from said discharge means to roll and chill the metal between said rolls, the peripheries of said rolls having channeled patterns therein, the channels being positioned to intersect each other to form studs therebetween, the studs of each roll contacting with the studs of the other roll at the normal peripheries of the rolls and being pressed together to force the molten metal from the areas occupied by the studs, and to mold the metal in the channeled portions of said rolls to form battery grids.

In testimony whereof I affix my signature.

ALEXANDER VAN DER LUFT.